(12) United States Patent
McDonald et al.

(10) Patent No.: US 8,326,519 B2
(45) Date of Patent: Dec. 4, 2012

(54) OXYGEN FLOW REDUCTION DURING ENGINE START/STOP OPERATION

(75) Inventors: Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 886 days.

(21) Appl. No.: 12/392,477

(22) Filed: Feb. 25, 2009

(65) Prior Publication Data
US 2010/0212629 A1    Aug. 26, 2010

(51) Int. Cl.
  *G06F 19/00* (2011.01)
  *F02N 11/08* (2006.01)
  *F02D 13/06* (2006.01)
(52) U.S. Cl. .......... 701/112; 123/179.4; 123/198 F; 701/103; 701/113
(58) Field of Classification Search .......... 123/90.11, 123/90.15–90.18, 179.3, 179.4, 179.16, 198 F, 123/347, 348, 403; 701/101–103, 110, 112, 701/113; 180/65.26, 65.28; 477/3–6; 903/905
See application file for complete search history.

(56) References Cited

U.S. PATENT DOCUMENTS

| 4,175,534 | A  |   | 11/1979 | Jordan |         |
|-----------|----|---|---------|--------|---------|
| 5,803,040 | A  | * | 9/1998  | Biesinger et al. | 123/198 F |
| 6,467,443 | B1 | * | 10/2002 | Tsuruta et al. | 123/90.16 |
| 6,988,572 | B2 | * | 1/2006  | Tatara et al. | 477/5 |
| 7,258,101 | B1 |   | 8/2007  | McDonald et al. |  |
| 7,540,344 | B2 | * | 6/2009  | Yamamoto et al. | 180/65.285 |
| 2010/0284823 | A1 |   | 11/2010 | Reynolds et al. |  |

FOREIGN PATENT DOCUMENTS

| DE | 10211119 |   | 9/2003 |         |
|----|----------|---|--------|---------|
| DE | 102005039663 |   | 9/2006 |     |
| DE | 102009040549 |   | 8/2010 |     |
| JP | 57086512 A | * | 5/1982 | 123/348 |
| JP | 2006144792 A | * | 6/2006 | 123/179.4 |

* cited by examiner

Primary Examiner — Willis R Wolfe, Jr.

(57) ABSTRACT

An engine control system comprises an intake valve deactivation module and an exhaust valve deactivation module. The intake valve deactivation module deactivates an intake valve of a cylinder of an engine based on an engine stop request such that the intake valve remains closed. The exhaust valve deactivation module deactivates an exhaust valve of the cylinder after the intake valve deactivation module deactivates the intake valve such that the exhaust valve remains closed.

20 Claims, 5 Drawing Sheets

OXYGEN FLOW REDUCTION DURING ENGINE START/STOP OPERATION

FIELD

The present disclosure relates to engine control systems, and more particularly to engine control systems for vehicles with cylinder deactivation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Active fuel management (AFM) or cylinder deactivation may be used to improve fuel economy in vehicles. Cylinder deactivation includes deactivating one or more cylinders of an engine during low load and cruising conditions to reduce pumping losses. When a cylinder is deactivated using AFM valve control strategies, the exhaust valve is deactivated before the intake valve. A burned charge of air that is above atmospheric pressure is trapped in the cylinder. The trapped burned charge remains trapped in the cylinder providing a gas spring effect on the pistons.

Engine start-stop operation may be used to improve fuel economy in vehicles. During periods when an engine would normally be idling, control cuts fueling to the engine causing the engine to stop. When the system senses that the driver is about to request the vehicle to accelerate, control restarts the engine.

SUMMARY

An engine control system comprises an intake valve deactivation module and an exhaust valve deactivation module. The intake valve deactivation module deactivates an intake valve of a cylinder of an engine based on an engine stop request such that the intake valve remains closed. The exhaust valve deactivation module deactivates an exhaust valve of the cylinder after the intake valve deactivation module deactivates the intake valve such that the exhaust valve remains closed.

In other features, the engine control system further comprising an engine start-stop module that generates the engine stop request during a start-stop engine mode that includes stopping rotation of an engine. The engine stop request is based on at least one of engine speed, a brake pedal position, an accelerator pedal position, and vehicle speed. The intake valve deactivation module deactivates the intake valve after the cylinder receives air and fuel. The exhaust valve deactivation module deactivates the exhaust valve after exhaust gas is expelled from the cylinder.

In still other features, the intake valve deactivation module deactivates the intake valve such that the intake valve remains closed after exhaust gas is expelled from the cylinder. The intake valve deactivation module deactivates the intake valve such that the intake valve remains closed while the engine stops rotating. In still other features, the exhaust valve deactivation module deactivates the exhaust valve such that the exhaust valve remains closed while the engine stops rotating.

In still other features, the intake valve deactivation module deactivates a plurality of intake valves of a plurality of cylinders based on an engine firing order. The exhaust valve deactivation module deactivates a plurality of exhaust valves of a plurality of cylinders based on the engine firing order.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
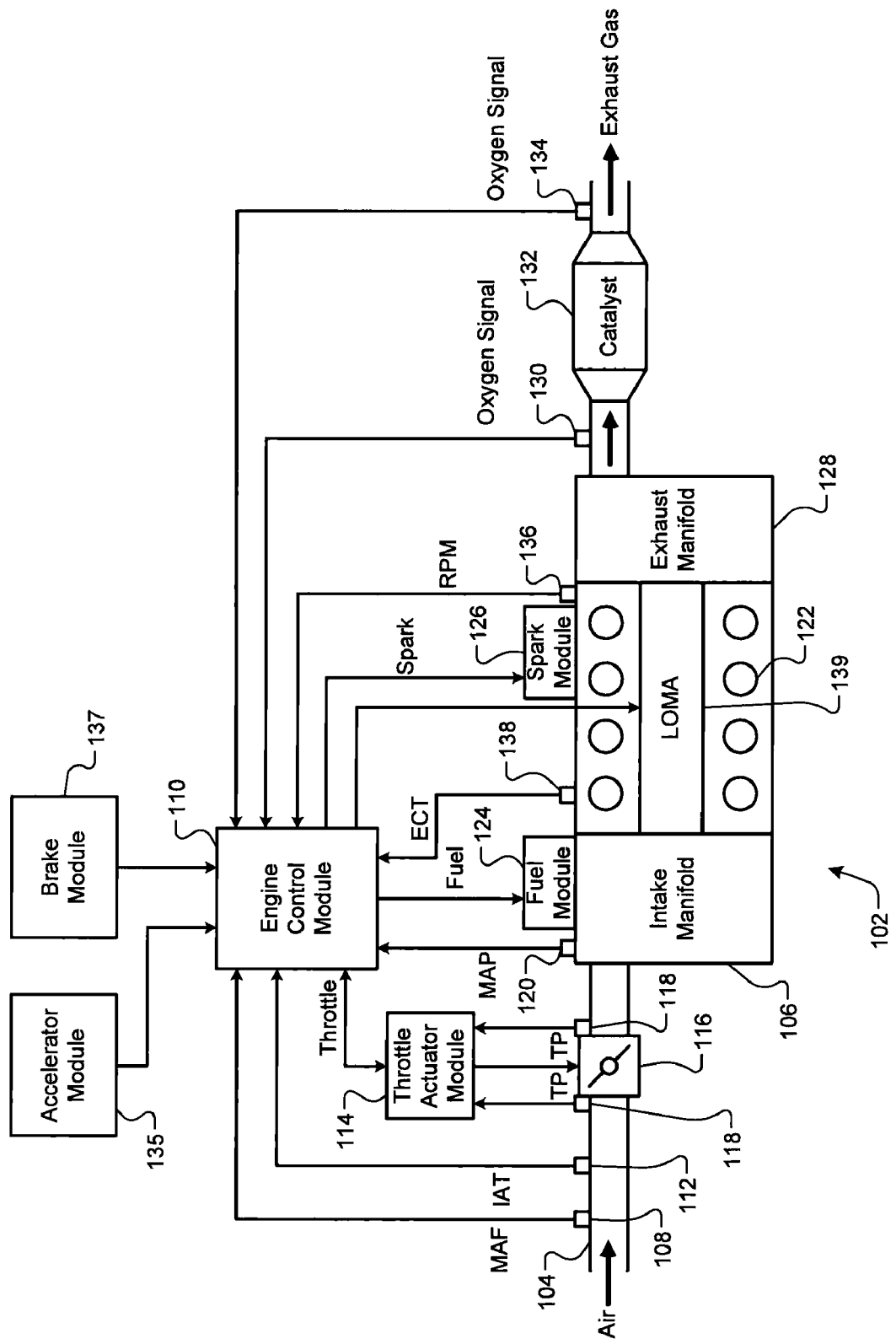
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, activated refers to operation using all of the engine cylinders. Deactivated refers to operation using less than all of the cylinders of the engine (one or more cylinders not active).

Engine start-stop operation may cause frequent stopping of the engine. As the engine stops rotating, fueling may be disabled. The intake valves and exhaust valves may open and close. The engine may pump fresh air containing high levels of oxygen through the cylinders to the catalyst. When the catalyst reaches a maximum oxygen storage capacity, nitrogen oxide (NOx) breakthrough may occur, reducing the ability of the catalytic converter to convert NOx emissions. Furthermore, the additional airflow causes heat to be transferred from the catalyst to the fresh air. The heat transfer may cool the catalyst and result in delayed catalyst warm-up and efficiency upon restarts.

The present oxygen flow reduction operation reduces the amount of air the engine pumps to the catalyst while the engine speed approaches zero. Reducing the amount of air reduces the oxygen pumped to the catalyst while the engine stops. The present oxygen flow reduction operation also reduces the amount of air trapped in the engine after the engine stops rotating. Reducing the amount of air trapped in the engine when the engine is stopped reduces the oxygen pumped to the catalyst when the engine restarts.

When an engine stop is commanded during engine start/stop operation, the intake valve and the exhaust valve of a cylinder are selectively deactivated to remain closed while the engine stops rotating. After receiving a final air/fuel charge, the intake valve closes and is deactivated so that the intake valve remains closed until the engine stops. Fueling to the cylinder may be disabled after the final air/fuel charge has been received. A final combustion event occurs and an exhaust valve opens to expel the exhaust. After expelling the exhaust, the exhaust valve closes and is deactivated so that the exhaust valve remains closed until the engine stops.

The intake valves and exhaust valves of each cylinder are deactivated in the same manner and in the firing order of the engine. While the engine speed decreases to a stop, the intake valves and the exhaust valves remain closed. The engine receives little or no fresh air. Therefore, the engine pumps little or no oxygen to the catalyst while stopping. Furthermore, little or no fresh air is trapped in the engine when the engine stops. Therefore, the engine pumps little or no oxygen to the catalyst during an engine restart.

Referring now to FIG. 1, an exemplary implementation of an internal combustion engine system is shown. Air enters an engine 102 through an air inlet 104 and travels to an intake manifold 106. A mass airflow (MAF) sensor 108 may be disposed in the inlet 104. The MAF sensor 108 generates a MAF signal based on a mass of the air entering the engine 102 and sends the MAF signal to an engine control module (ECM) 110. An intake air temperature (IAT) sensor 112 may also be disposed in the inlet 104. The IAT sensor 112 generates an IAT signal based on a temperature of the air and sends the IAT signal to the ECM 110.

A throttle actuator module 114 positions a throttle 116 to control the airflow entering the intake manifold 106. The ECM 110 may generate a throttle signal to control the throttle actuator module 114 based on a desired torque output of the engine. Throttle position (TP) sensors 118 generate TP signals based on a position of the plate and send the TP signals to the throttle actuator module 114. A manifold absolute pressure (MAP) sensor 120 generates a MAP signal based on a pressure inside the intake manifold 106 and sends the MAP signal to the ECM 110.

The intake manifold 106 distributes the air to cylinders 122. A fuel module 124 may cause a fuel injector (not shown) to inject a mass of fuel into the intake manifold 106 at a central location or at multiple locations. Alternatively, the fuel injector may inject the fuel directly into the cylinders 122. In a gasoline engine, the fuel mass may be based on the airflow signal generated by the MAF sensor 108. Pistons (not shown) inside the cylinders 122 receives the fuel and air during an intake stroke. The air and fuel mix inside the cylinders 122 to create an air/fuel mixture.

The pistons within the cylinders 122 compress the air/fuel mixture during a compression stroke. A spark module 126 may cause a spark plug (not shown) to ignite the air/fuel mixture during a combustion or power stroke. The combustion of the air/fuel mixture increases the pressure in the cylinders 122 and forces the pistons to impart a torque on a crankshaft (not shown) in the engine. The combustion causes exhaust gas to form in the cylinder 122 which exit through an exhaust system including an exhaust manifold 128 and pass by an oxygen sensor 130. The oxygen sensor senses an oxygen amount in the exhaust gas and sends an oxygen signal based on the oxygen amount to the ECM 110.

The exhaust gas flows through the exhaust system to a catalyst 132 which may store oxygen from the exhaust gas. The catalyst may convert both hydrocarbons and NOx gases based on the amount of unburned oxygen that remains in the exhaust gas and in the catalyst 132. A second oxygen sensor 134 senses an oxygen amount in the exhaust gas and sends an oxygen signal based on the oxygen amount to the ECM 110.

An engine speed sensor 136 generates a revolutions per minute (RPM) signal based on a position of the crankshaft and sends the RPM signal to the ECM 110. An engine coolant temperature (ECT) sensor 138 generates an ECT signal based on a temperature of a coolant circulating through the engine 102 and sends the ECT signal to the ECM 110. A vehicle speed sensor (not shown) may generate a vehicle speed signal based on a position of a transmission and/or a drive wheel associated with the engine 102.

An accelerator module 135 may generate an accelerator pedal position signal based on a position of an accelerator pedal (not shown) to regulate the throttle 116. The accelerator pedal position may be based on input by a vehicle operator to the accelerator pedal. The ECM 110 generates a throttle control signal based on the accelerator pedal position signal. The throttle actuator module 114 adjusts the throttle 116 based on the throttle control signal to regulate air flow into the engine 102.

A brake module 137 may generate a brake pedal position signal based on a position of a brake pedal (not shown). The brake pedal position may be based on input by a vehicle operator to the brake pedal. The ECM 110 generates a brake control signal based on the brake pedal position signal. A brake system (not shown) adjusts vehicle braking based on the brake control signal to regulate vehicle speed.

The engine load may be determined based on the MAP signal and/or the MAF signal, the cylinders 122, and engine speed. More particularly, if the MAP is less than a threshold for a given engine speed, the engine load may be deemed a light load and the engine 102 may be transitioned to AFM mode. If the MAP is greater than or equal to the threshold for the given RPM, the engine load may be deemed a heavy load and the engine 102 may be operated in normal mode, in which all cylinders 122 are activated. The ECM 110 may control a lifter oil manifold assembly (LOMA) 139 and the fuel module 124 to deactivate cylinders 122 during an engine start-stop mode as discussed in further detail below.

Figure 2:
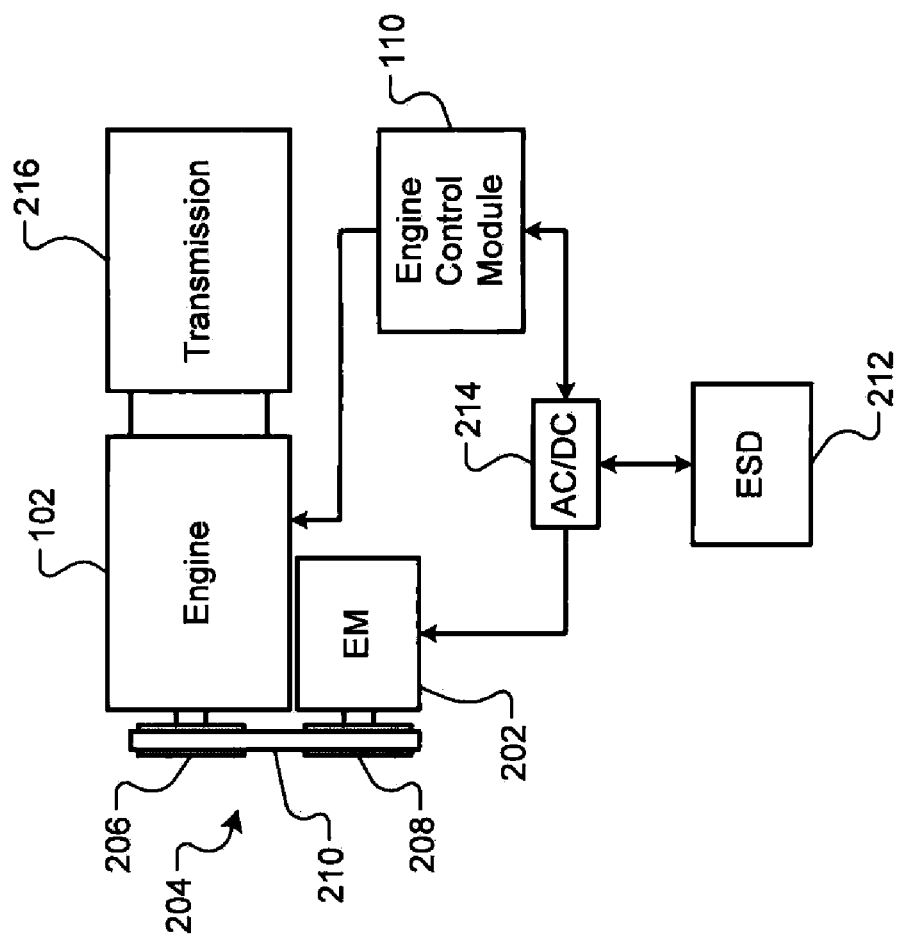
FIG. 2 is a functional block diagram of an exemplary engine system including an electric motor/generator according to the principles of the present disclosure.

Referring now to FIG. 2, the engine 102 may be coupled to an electric machine 202 by a belt-alternator-starter (BAS) system 204. BAS system 204 may include pulleys 206 and 208 that are coupled for rotation by a belt 210. The pulley 206 may be coupled for rotation with the crankshaft (not shown) of the engine 102. The pulley 208 may be coupled for rotation with the electric machine 202 The electric machine 202 may be used to start the engine 102. The BAS system 204 may be replaced with a flywheel-alternator-starter (FAS) system (not shown), which may include an electric machine operably disposed between the engine 102 and a transmission 216 or a chain or gear system that is implemented between the electric machine 202 and the crankshaft.

More specifically, the electric machine 202 may be an engine starter (i.e., motor) and/or an alternator (i.e., generator). In yet another implementation, a hybrid engine may include an electric machine such as an electric motor used to start the engine 102 and/or the vehicle.

Engine control module 110 may operate the engine 102 and electric machine 202 in various modes. In one mode, the engine 102 may drive the electric machine 202 to generate power used to recharge an energy storage device (ESD) 212. In another mode, the electric machine 202 drives the engine 102 using energy from the ESD 212. An AC/DC converter 214 may be used between the ESD 212 and the electric machine 202. The ESD 212 can include, but is not limited to, a battery or a super-capacitor.

When no engine torque is desired to move the vehicle forward, the ECM 110 may initiate start-stop control to stop the engine 102 and increase fuel efficiency. Start-stop control may include cutting fueling to the cylinders 122. During start-stop control of the present disclosure, the ECM 110 may stop the engine 102 by deactivating an intake valve train before an intake stroke. The ECM 110 deactivates an exhaust valve train after each cylinder completes an exhaust stroke. Each cylinder 122 is deactivated in firing order such the engine 102 pumps little or no fresh air to the catalyst 132 while stopping. The ECM may later restart the engine 102 by using the electric machine 202.

Figure 3:
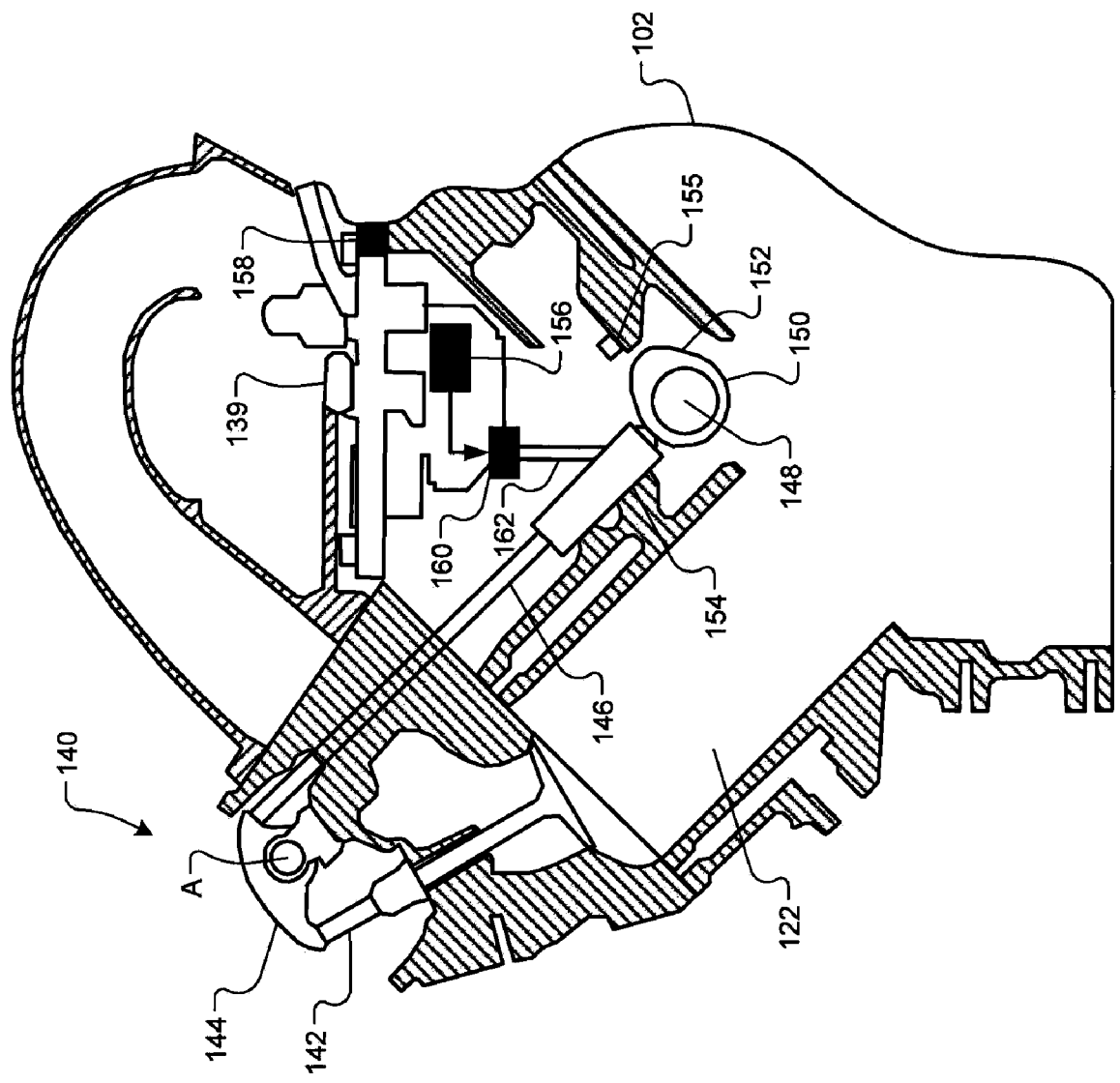
FIG. 3 illustrates an exemplary valve deactivation component.

Referring now to FIG. 3, an intake valvetrain 140 of the engine 102 may include an intake valve 142, a rocker 144 and a pushrod 146 associated with each cylinder 122. The engine 102 includes a rotatably driven camshaft 148, and a plurality of valve cams 150 disposed on the camshaft 148. A cam surface 152 of the valve cams 150 engage the lifters 154 to cycle the intake valves 142. The intake valve 142 is biased to a closed position by a biasing member (not shown) such as a spring. As a result, the biasing force is transferred through the rocker 144 to the pushrod 146, and from the pushrod 146 to the lifter 154, causing the lifter 154 to press against the cam surface 152.

As the camshaft 148 rotates, the valve cam 150 induces linear motion of the corresponding lifter 154. The lifter 154 induces linear motion in the corresponding pushrod 146. As the pushrod 146 moves outward, the rocker 144 pivots about an axis (A). Pivoting of the rocker 144 induces movement of the intake valve 142 toward an open position. The biasing force induces the intake valve 142 to the closed position as the camshaft 148 continues to rotate. The intake valve 142 is cyclically opened to enable air intake.

A camshaft position sensor (CPS) 155 generates a camshaft position signal based on the position of the camshaft 148. The CPS 155 may be used to determine positions of the cylinders 122 in an engine firing order. In particular, the CPS 155 may be used to determine fuel timing, ignition timing, and valve positions. For example, the CPS 155 may be used to determine the current stroke of each cylinder 122 and the associated valves. The cylinders 122 may operate in a four-stroke cycle including intake, compression, combustion, and, exhaust strokes.

Although the intake valvetrain 140 of the engine 102 is illustrated in FIG. 3, the engine 102 may also include an exhaust valvetrain (not shown) that operates in a similar manner. More specifically, the exhaust valvetrain includes an exhaust valve, a rocker and a pushrod associated with each cylinder 122. Rotation of the camshaft 148 induces reciprocal motion of the exhaust valves to open and close associated exhaust ports, as similarly described above for the intake valvetrain 140.

The LOMA 139 provides pressurized fluid to a plurality of lifters 154 and includes solenoids 156 (shown schematically) associated with cylinders 122. The lifters 154 are disposed within the intake and exhaust valvetrains to provide an interface between the cams 150 and the pushrods 146. In general, there are two lifters 154 provided for each cylinder 122 (one lifter for the intake valve 142 and one lifter for the exhaust valve). It is anticipated, however, that more lifters 154 can be associated with each cylinder 122 (i.e., multiple inlet or exhaust valves per cylinder 122). The LOMA 139 may include a pressure sensor 158 that generates a pressure signal indicating a pressure of a hydraulic fluid supply to the LOMA 139. One or more pressure sensors 158 may be implemented.

Each lifter 154 associated with the cylinders 122 is hydraulically actuated between first and second modes. The first and second modes respectively correspond to the activated and deactivated modes. In the first mode, the lifter 154 provides a mechanical connection between the cam 150 and the pushrod 146. In this manner, the cam 150 induces linear motion of the lifter 154, which is transferred to the pushrod 146. In the second mode, the lifter 154 functions as a buffer to provide a mechanical disconnect between the cam 150 and the pushrod 146. Although the cam 150 induces linear motion of the lifter 154, the linear motion is not transferred to the pushrod 146.

The solenoids 156 selectively enable hydraulic fluid to flow to the lifters 154 to switch the lifters 154 between the first and second modes. Although there is generally one solenoid 156 associated with each select cylinder 122 (i.e., one solenoid for two lifters), it is anticipated that more or fewer solenoids 156 can be implemented. Each solenoid 156 actuates an associated valve 160 (shown schematically) between open and closed positions. In the closed position, the valve 160 inhibits pressurized hydraulic fluid flow to the corresponding lifters 154. In the open position, the valve 160 enables pressurized fluid flow to the corresponding lifters 154 via a fluid passage 162. The pressurized hydraulic fluid flow is provided to the LOMA 139 from a pressurized hydraulic fluid source.

Other components that may be used to deactivate cylinders include electrically disabling the valvetrain. Furthermore, other valvetrains including overhead camshafts may be used to activated the valves. The present disclosure may be applicable to any engines utilizing start-stop control and cylinder deactivation.

Figure 4:
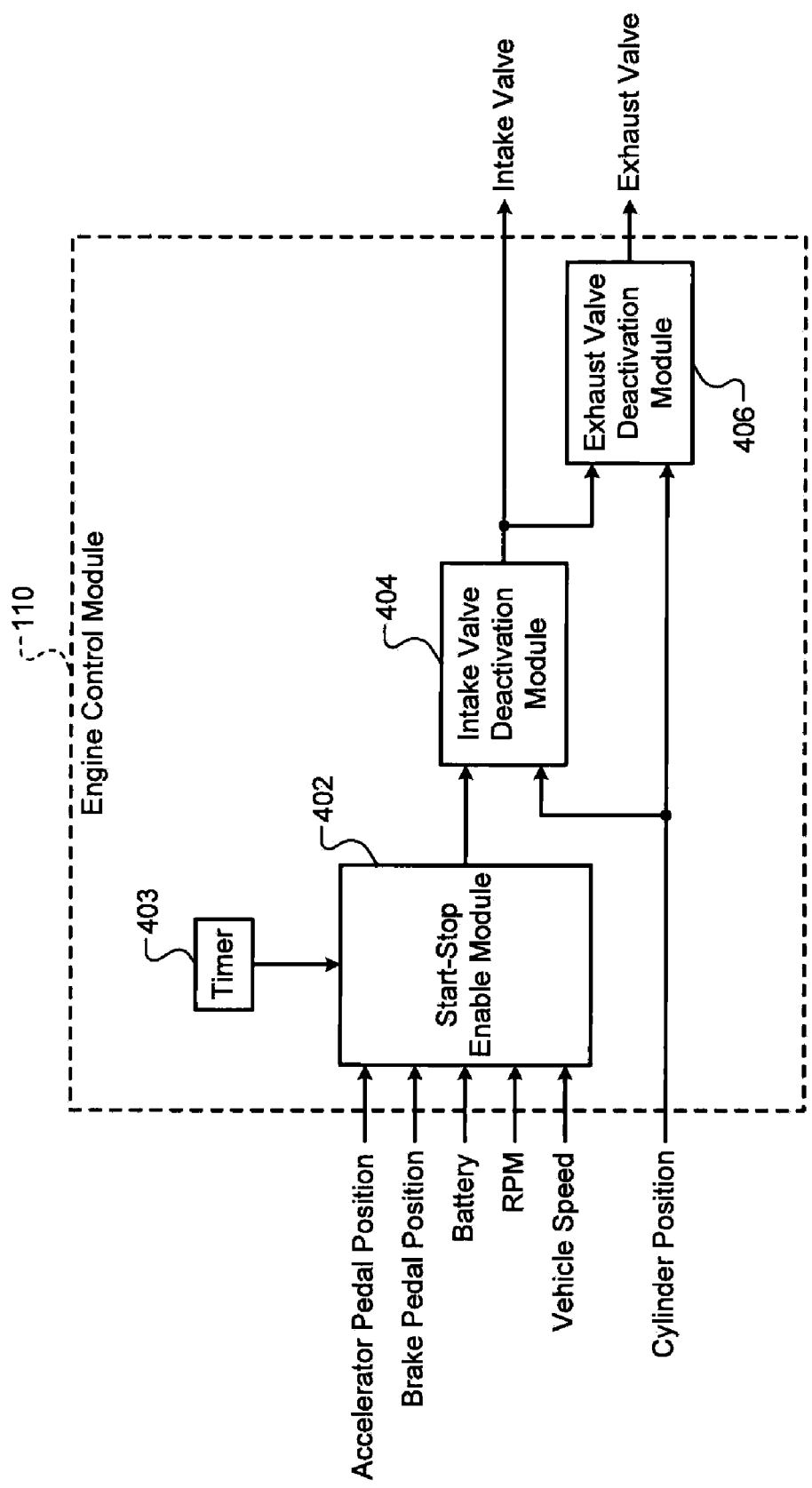
FIG. 4 is a functional block diagram of an exemplary implementation of an engine control module according to the principles of the present disclosure.

Referring now to FIG. 4, an exemplary implementation of the ECM 110 is shown in further detail. A start-stop enable module 402 may enable the start/stop mode based on engine speed, a signal from the ESD (such as a battery voltage output), and/or vehicle speed. For example only, the enable module may enable the start/stop mode when the engine speed is below an idle threshold. The start-stop enable module 402 may prevent the engine 102 from stopping in the start-stop mode when a battery, or other device used for starting the engine, is below a predetermined energy level threshold.

The start-stop enable module 402 may generate a start/stop request based on the accelerator pedal position, the brake pedal position, and a timer value 403. For example only, when the brake pedal position is greater than a brake threshold for a predetermined time, the engine stop request may be generated. The predetermined time may indicate a desire to stop the vehicle. When the accelerator pedal position is greater than an accelerator threshold, a start request may be generated.

When the start-stop mode is enabled and a stop signal is generated, an intake valve deactivation module 404 may deactivate the intake valve of a cylinder 122. The intake valve deactivation module 404 may determine the stroke of the piston based on the camshaft position signal. When the CPS 155 indicates completion of an intake stroke, the intake valve may be deactivated. While the intake valve is deactivated, the intake valve remains closed. For example, the intake valve deactivation module 404 may send a signal to the LOMA 139 to disconnect the cam from the pushrod so the intake valve remains closed.

After the intake valve is deactivated, an exhaust valve deactivation module 406 may deactivate the exhaust valve of the respective cylinder following an exhaust stroke. The cylinder may combust an air/fuel charge from the intake stroke during the combustion stroke. The cylinder may expel the exhaust during the exhaust stroke before the exhaust valve is deactivated. For example, the exhaust valve deactivation module 406 may send a signal to the LOMA 139 to disconnect the cam from the pushrod so the exhaust valve remains closed. In addition, fueling to the cylinder 122 may be cut based on the start-stop enable and engine stop signals.

The start/stop mode may deactivate each of the cylinders 122 based on the cylinder position and engine firing order. After each of the cylinders 122 receives fuel and a fresh air charge during an intake stroke, the respective intake valve closes and is deactivated. By deactivating the intake valve, the cylinder is prevented from receiving any further fresh air from the intake manifold. The compression stroke occurs followed by the combustion stroke. After combustion, the exhaust valve opens to expel the exhaust. After expelling the exhaust, the exhaust valve closes and is deactivated. By deactivating the exhaust valve, the cylinder is prevented from receiving any exhaust gas due to an exhaust backflow on a subsequent intake stroke.

The valves may remain deactivated until the engine speed is less than or equal to a predetermined threshold. For example, the engine speed continues to decrease until the engine is stopped and engine speed is zero. While the engine speed decreases, little or no fresh air flows through the engine 102. Therefore, little or no oxygen is pumped to the catalyst 132. When the engine 102 is stopped, the valves may be activated again. The valves may be activated when the start-stop enable module 402 generates an engine start request before the engine speed is less than or equal to the predetermined threshold.

Figure 5:
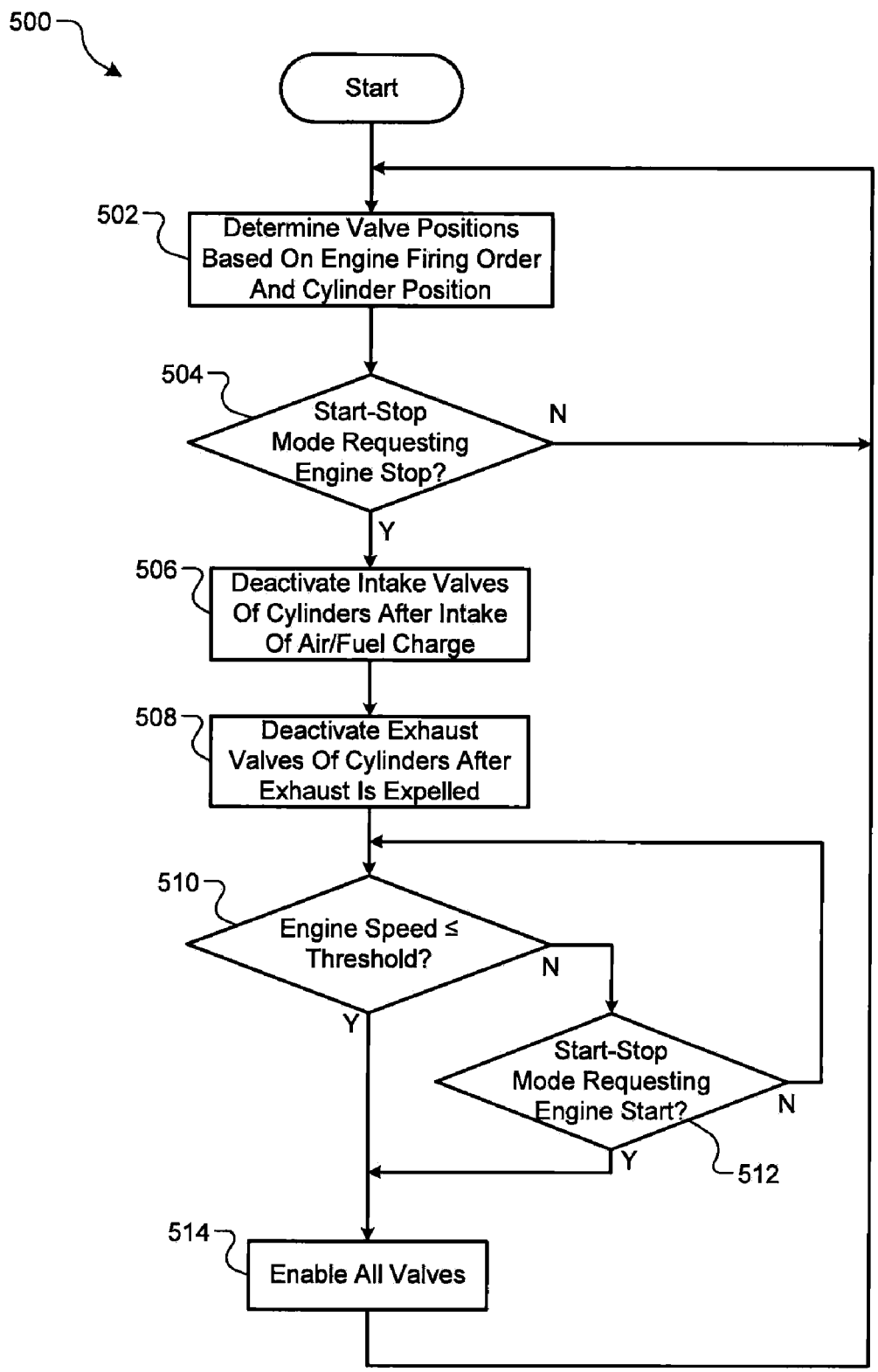
FIG. 5 is a flowchart depicting exemplary steps performed by a control system according to the principles of the present disclosure.

Referring now to FIG. 5, exemplary steps of a method 500 for operating the engine system of FIGS. 1-4 are shown. In step 502, control determines valve positions based on engine firing order and camshaft position. In step 504, control determines whether start-stop control requests an engine stop. When an engine stop is requested, control begins to deactivate the cylinders in firing order.

In step 506, control deactivates the intake valve of each cylinder after each cylinder completes an intake stroke. The intake stroke may include air and fuel entering the cylinder. The intake valve remains closed when it is deactivated. The air and fuel combust causing exhaust gas to form which is then expelled from each cylinder via corresponding exhaust valves.

In step 508, control deactivates the exhaust valve of each cylinder after the exhaust stroke. The exhaust stroke may include exhaust gas exiting the cylinder. The exhaust valve remains closed when it is deactivated. While the engine speed decreases to a stop, the intake valves and exhaust valves remain closed and are substantially cleared of air, fuel, and exhaust gas.

In step 510, control determines whether the engine speed is less than or equal to a threshold. For example, the threshold may be 0, indicating that the engine has stopped rotating. While the engine speed is greater than the threshold, control may determine whether a start-stop mode engine start is requested in step 512. When an engine start is requested, control enables all valves in step 514. Otherwise, control returns to step 510. When the engine speed is less than or equal to the threshold, control enables all valves in step 514.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
   an intake valve deactivation module that deactivates an intake valve of a cylinder of an engine after an intake stroke of the cylinder based on an engine stop request such that the intake valve remains closed; and
   an exhaust valve deactivation module that deactivates an exhaust valve of the cylinder after the intake valve deactivation module deactivates the intake valve such that the exhaust valve remains closed.

2. The engine control system of claim 1, further comprising an engine start-stop module that generates the engine stop request during a start-stop engine mode that includes stopping rotation of the engine.

3. The engine control system of claim 1, wherein the engine stop request is based on at least one of engine speed, a brake pedal position, an accelerator pedal position, and vehicle speed.

4. The engine control system of claim 1, wherein the intake valve deactivation module deactivates the intake valve after the cylinder receives air and fuel.

5. The engine control system of claim 1, wherein the exhaust valve deactivation module deactivates the exhaust valve after exhaust gas is expelled from the cylinder.

6. The engine control system of claim 1, wherein the intake valve deactivation module deactivates the intake valve such that the intake valve remains closed after exhaust gas is expelled from the cylinder.

7. The engine control system of claim 1, wherein the intake valve deactivation module deactivates the intake valve such that the intake valve remains closed while the engine stops rotating.

8. The engine control system of claim 1, wherein the exhaust valve deactivation module deactivates the exhaust valve such that the exhaust valve remains closed while the engine stops rotating.

9. The engine control system of claim 1, further comprising a plurality of cylinders including a plurality of intake valves wherein the intake valve deactivation module deactivates the intake valve of each cylinder based on an engine firing order.

10. The engine control system of claim 1, further comprising a plurality of cylinders including a plurality of exhaust valves wherein the exhaust valve deactivation module deactivates the exhaust valve of each cylinder based on an engine firing order.

11. A method comprising:
    deactivating an intake valve of a cylinder of an engine after an intake stroke of the cylinder based on an engine stop request such that the intake valve remains closed; and
    deactivating an exhaust valve of the cylinder after the intake valve is deactivated such that the exhaust valve remains closed.

12. The method claim 11, further comprising generating the engine stop request during a start-stop engine mode that includes stopping rotation of the engine.

13. The method claim 11, further comprising generating the engine stop request based on at least one of engine speed, a brake pedal position, an accelerator pedal position, and vehicle speed.

14. The method claim 11, further comprising deactivating the intake valve after the cylinder receives air and fuel.

15. The method claim 11, further comprising deactivating the exhaust valve after exhaust gas is expelled from the cylinder.

16. The method claim 11, further comprising deactivating the intake valve such that the intake valve remains closed after exhaust gas is expelled from the cylinder.

17. The method claim 11, further comprising deactivating the intake valve such that the intake valve remains closed while the engine stops rotating.

18. The method claim 11, further comprising deactivating the exhaust valve such that the exhaust valve remains closed while the engine stops rotating.

19. The method claim 11, further comprising deactivating at least one of a plurality of intake valves of a plurality of cylinders and a plurality of exhaust valves of the plurality of cylinders based on an engine firing order.

20. A method comprising:
   generating an engine stop request; and
   deactivating a plurality of cylinders of an engine in a firing order of the engine when the engine stop request is generated.

\* \* \* \* \*